United States Patent

So et al.

(10) Patent No.: US 11,506,413 B2
(45) Date of Patent: Nov. 22, 2022

(54) METHOD AND CONTROLLER FOR CONTROLLING A CHILLER PLANT FOR A BUILDING AND CHILLER PLANT

(71) Applicant: Siemens Schweiz AG, Zürich (CH)

(72) Inventors: King Fai So, Hong Kong (HK); Lei Lu, Suzhou (CN); Yong Yu, Hong Kong (HK)

(73) Assignee: SIEMENS SCHWEIZ AG

( * ) Notice: Subject to any disclaimer, the term of this patent is extended or adjusted under 35 U.S.C. 154(b) by 148 days.

(21) Appl. No.: 16/866,894

(22) Filed: May 5, 2020

(65) Prior Publication Data
US 2020/0355392 A1  Nov. 12, 2020

(30) Foreign Application Priority Data
May 9, 2019  (EP) ..................................... 19173598

(51) Int. Cl.
*F24F 11/63* (2018.01)
*G05B 13/02* (2006.01)
(Continued)

(52) U.S. Cl.
CPC .......... *F24F 11/63* (2018.01); *G05B 13/0265* (2013.01); *G05B 13/048* (2013.01); *F24F 2140/50* (2018.01); *F24F 2140/60* (2018.01)

(58) Field of Classification Search
CPC .... F24F 11/63; F24F 2140/50; F24F 2140/60; G05B 13/0265; G05B 13/048;
(Continued)

(56) References Cited

U.S. PATENT DOCUMENTS

2016/0091904 A1  3/2016  Horesh et al.
2019/0236446 A1* 8/2019  Qin ......................... G06N 3/04
2019/0378020 A1* 12/2019  Camilus ............... G05B 13/048

FOREIGN PATENT DOCUMENTS

WO  2018004464 A1  1/2018

OTHER PUBLICATIONS

Bechtler H. et al: "New approach to dynamic modelling of vapour-ompression liquid chillers: artificial neural networks", Applied Thermal Engineering, vol. 21, No. 9, pp. 941-953, XP055638761, GB; ISSN: 1359-4311, DOI: 10.1016/S1359-4311(00)00093-4; pp. 947; 2001.
(Continued)

*Primary Examiner* — Jigneshkumar C Patel
(74) *Attorney, Agent, or Firm* — Schmeiser, Olsen & Watts LLP

(57) ABSTRACT

Environmental data of an environment of the building and cooling load demand data are received as first training data, which are used for training a first machine learning model to predict a cooling load demand from environmental data. Furthermore, control signals for the chiller plant and cooling power data resulting from applying the control signals to the chiller plant are received as second training data which are used for training a second machine learning model to predict a cooling power from control signals. Actual environmental data are received, from which a cooling load demand is predicted by the trained first machine learning model. Furthermore, candidate control signals for the chiller plant are generated, and from which a resulting cooling power is predicted by the trained second machine learning model. From the candidate control signals, applicable control signals are selected for which a predicted cooling power fulfills the predicted cooling load demand.

13 Claims, 3 Drawing Sheets

(51) Int. Cl.
   *G05B 13/04*      (2006.01)
   *F24F 140/60*     (2018.01)
   *F24F 140/50*     (2018.01)
(58) Field of Classification Search
   CPC . G05B 15/02; G05B 2219/2614; G06F 30/27; G06F 2119/08; G06N 20/20
   USPC .......................................................... 700/299
   See application file for complete search history.

(56) References Cited

OTHER PUBLICATIONS

Qiuying Zou et al: "Model predictive control based on particle swarm optimization of greenhouse climate for saving energy consumption", World Automation Congress (WAC), 2010, IEEE, Piscataway, NJ, USA; pp. 123-128, XP031833558, ISBN: 978-1-4244-9673-0; * the whole document; 2010.
European Search Report for Application No. 19173598.4, dated Dec. 17, 2019.

* cited by examiner

METHOD AND CONTROLLER FOR CONTROLLING A CHILLER PLANT FOR A BUILDING AND CHILLER PLANT

CROSS-REFERENCE TO RELATED APPLICATIONS

This application claims priority to EP Application No. 19173598.4, having a filing date of May 9, 2019, the entire contents of which are hereby incorporated by reference.

FIELD OF TECHNOLOGY

The following relates to a method and controller for controlling a chiller plant for a building and chiller plant.

BACKGROUND

Modern buildings are often equipped with a building automation system (BAS) for controlling various components of the building like its air conditioning, heating, ventilation, or lighting. The controlling is usually aimed at improving living comfort, resource consumption, life-time of building components, and other physical, economical, or ecological parameters of the building.

Centralized air conditioning systems are among the primary energy consumers, particularly in non-residential buildings. Therefore, efforts are made to reduce the power consumption of such air conditioning systems while maintaining or optimizing living comfort. Known efforts include manual, know-how-based adjustment of building management systems, upgrade of chiller equipment, or static rule-based analytics. A data driven approach using machine learning methods is known from the document WO2018/004464A1.

However, those known approaches depend on the particular implementation of the chiller plant and on other static assumptions about the chiller plant and the building.

SUMMARY

An aspect relates to provide a method and a controller for controlling a chiller plant for a building and to provide a chiller plant that allow for a more flexible operation of the chiller plant.

According to embodiments of the present invention, environmental data of an environment of the building and cooling load demand data are received as first training data. The environmental data may particularly include weather data, temperature data, humidity data, atmospheric pressure data, precipitation data, UV index data, wind data, historical data, measured sensor data, calendar dates, and/or time data. The cooling load demand data may be obtained from recorded historical demand data or from sensor data measured during operation of the chiller plant. The first training data are used for training a first machine learning model to predict a cooling load demand from environmental data. Furthermore, control signals for the chiller plant and cooling power data resulting from applying the control signals to the chiller plant are received as second training data. The control signals may comprise signals to control or adjust a speed of a condenser water pump, a speed of a chilled water pump, a speed of a cooling tower fan, a water pipe pressure set point, a chiller set point, and/or a chiller water valve opening degree. The control signals and/or the cooling power data may be obtained from recorded historical data or from sensor data measured during operation of the chiller plant.

The second training data are used for training a second machine learning model to predict a cooling power from control signals. Moreover, actual environmental data are received, and from the actual environmental data a cooling load demand is predicted by the trained first machine learning model. Furthermore, candidate control signals for the chiller plant are generated, and from the candidate control signals a resulting cooling power is predicted by the trained second machine learning model. From the candidate control signals, applicable control signals are selected for which a predicted cooling power fulfills the predicted cooling load demand. The applicable control signals are output for controlling the chiller plant.

For executing the inventive method, a controller, a chiller plant, a computer program product (non-transitory computer readable storage medium having instructions, which when executed by a processor, perform actions), and a computer readable storage medium are provided.

The inventive method and/or the inventive controller may be implemented by means of one or more processors, computers, application specific integrated circuits (ASIC), digital signal processors (DSP), and/or field-programmable gate arrays (FPGA).

The usage of machine learning models for learning dependencies between environmental data and a cooling load demand and for learning dependencies between control signals and a resulting cooling power allows for an efficient adaptation of learned control policies. In particular, such control policies may efficiently adapt to different and varying environmental situations, and on the other hand, may also automatically adapt to different chiller plant implementations and application areas.

According to an exemplary embodiment of the invention, power consumption data resulting from applying the control signals to the chiller plant may be received as second training data. The power consumption data may be used for training the second machine learning model to predict a power consumption of the chiller plant from control signals. The trained second machine learning model may be used to predict a resulting power consumption from the candidate control signals. From the candidate control signals, applicable control signals may be selected for which the predicted power consumption is lower than a predicted power consumption resulting from other candidate control signals. Those candidate control signals may be selected as applicable control signals that result in a minimal or otherwise optimized predicted power consumption. In addition to the power consumption data or instead of the power consumption data a further operational parameter or performance parameter of the chiller plant or of the building may be used for training the second machine learning model to predict such operational parameter or performance parameter from control signals. The operational parameter or performance parameter may specify wear, lifespan, pollutant emissions, and/or resource consumption of the chiller plant, of its components, or of the building. In operation, the operational parameter or performance parameter may be predicted from the candidate control signals, and the applicable control signals may be selected depending on the predicted operational parameter or performance parameter. Those candidate control signals may be selected as applicable control signals that result in an optimized performance parameter or operational parameter. The above features allow to determine applicable control signals that are expected to optimize or to improve the power consumption or other performance parameters or operational parameters of the chiller plant while fulfilling a cooling load demand.

The environmental data may also be used as second training data for training the second machine learning model to predict a cooling power and/or a power consumption of the chiller plant from control signals.

According to a further advantageous embodiment of the invention, building data regarding a structure or status of the building and/or occupancy data regarding an occupancy of the building may be received. The building data and/or the occupancy data may be taken into account in the training of the first machine learning model and/or in the training of the second machine learning model. The building data may specify a number, size, position or structuring of floors, rooms, stairs, lifts, and/or other facilities of the building. Furthermore, the building data may specify a status of the building, e.g. whether a window or a door is open or closed, or may comprise sensor measurements, e.g. of temperatures within the building.

Using environmental data, building data and/or occupancy data for the training of the first and/or second machine learning model often improves a prediction accuracy of the respective machine learning model.

According to a further advantageous embodiment of the invention, several components of the chiller plant differing in their inner dynamics may be jointly modeled by the second machine learning model in an at least partially component-agnostic manner. In particular, the second machine learning model may include one or more modelling parameters that are common to the several components and are used for jointly modelling their inner dynamics. In this way, several individual chillers and/or different components of the chillers, e.g. condenser water pumps, chilled water pumps, cooling tower fans, water valves, or other mechanical, electrical or physical components may be jointly modeled as one system. In a certain sense, this approach may be regarded as holistic or system-wide as opposed to equipment-specific or component-specific.

In many cases, this approach allows to automatically detect, model, and/or reproduce hidden interdependencies between the different inner dynamics across the different components. Therefore, it can be expected that this approach generally improves adaptation and/or optimization capabilities of the inventive method. In particular, an exchange, an addition, a removal, or a modification of components often needs no or only marginal manual adaptation of the learning models.

According to a further advantageous embodiment of the invention the second machine learning model may comprise a partial machine learning model specifically adapted for modeling a particular component of the chiller plant. In this way some domain knowledge about that particular component can be used to specifically adapt the partial machine learning model to the particular component.

Furthermore, a recommendation data record may be generated from the applicable control signals, and the generated recommendation data record may be output via a user interface. Such recommendation data may indicate or specify advantageous or optimal settings, e.g. temperature settings of the user equipment to the user.

Moreover, further first training data and/or further second training data may be measured during operation of the chiller plant. By means of the further first training data and/or the further second training data the trained first machine learning model and/or the trained second machine learning model may be further trained during the operation of the chiller plant. This often allows for an adaptive and continuous improvement of the control of the chiller plant, in particular based on demand feedback, usage of the building, and/or the outdoor environment.

According to an advantageous embodiment of the invention the applicable control signals may be determined by means of a particle swarm optimization method, a genetic algorithm and/or a gradient decent method. The above optimization methods usually allow for a robust and efficient determination and/or optimization of the applicable control signals with relatively low computational effort.

BRIEF DESCRIPTION

Some of the embodiments will be described in detail, with reference to the following figures, wherein like designations denote like members, wherein.

DETAILED DESCRIPTION

Figure 1:
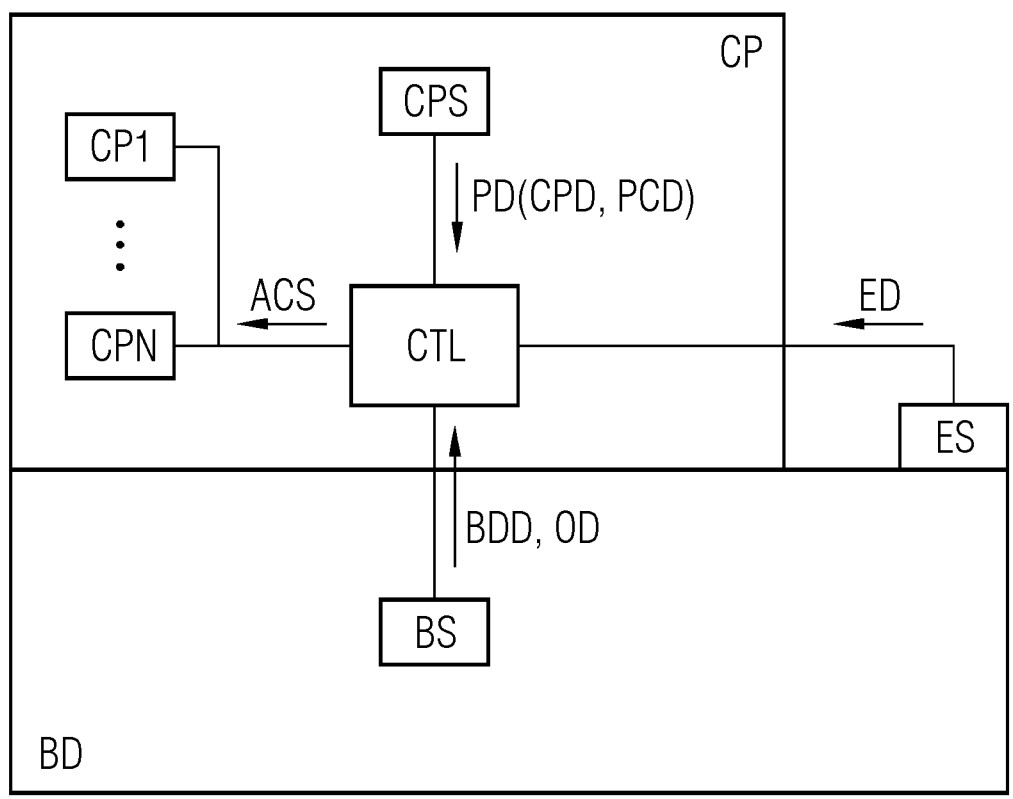
FIG. 1 depicts a building equipped with a chiller plant.

FIG. 1 shows a residential or non-residential building BD equipped with a chiller plant CP in schematic representation. The chiller plant CP may be part of a centralized air conditioning system or of a building automation system. The chiller plant CP comprises several different components CP1, ..., CPN, e.g. individual chillers, condenser water pumps, chilled water pumps, cooling tower fans, water valves, or other mechanical, electrical or physical components.

The chiller plant components CP1, ..., CPN are coupled to a controller CTL, which controls the chiller plant CP and its components CP1, ..., CPN. The controller CTL may be implemented inside the chiller plant CP or at least partially external to the chiller plant CP. For controlling the components CP1, ..., CPN the controller CTL generates and outputs control signals ACS which are transmitted and applied to the components CP1, ..., CPN.

For the generation of the control signals ACS various operational data, sensor data and/or other data of the chiller plant CP, the building BD and/or its environment are acquired and evaluated. For this purpose, the building BD is equipped with environment sensors ES for measuring and providing environmental data ED and with building sensors BS for measuring and providing building data BDD and occupancy data OD. Further building data BDD, in particular static building data BDD may be provided by a building repository.

Moreover, the chiller plant CP has performance sensors CPS for measuring and providing performance data PD, regarding a performance of the chiller plant CP or of its components CP1, ..., CPN. The environment sensors ES, the building sensors BS, and the performance sensors CPS are coupled to the controller CTL.

The environmental data ED may quantify several environmental quantities and may comprise weather data, temperature data, humidity data, precipitation data, UV index data, wind data, and/or atmospheric pressure data. The building data BDD may quantify static or dynamic building properties regarding a structure or a status of the building BD. In particular, they may specify a number, a size, a position or a structuring of floors, rooms, stairs, lifts, and/or other facilities of the building BD. The building data BDD may also specify whether a window or a door is open or closed, or may comprise data about temperatures within the building BD or other data about a status of the building BD. The occupancy data OD quantify an occupancy of the building BD.

The performance data PD particularly comprise cooling power data CPD, quantifying a cooling power of the chiller plant CP, and power consumption data PCD, quantifying a power consumption of the chiller plant CP. The performance data PD may further quantify other performance quantities like e.g. pollutant emissions, resource consumption, wear, and/or lifespan of the chiller plant CP or of its components CP1, ..., CPN.

The sensors ES, BS, and CPS transmit their measured data ED, BDD, OD, and PD to the controller CTL. The controller CTL also receives calendar dates and/or time data as further environmental data ED. Additionally, the controller CTL may receive specific operational data as performance data PD. Such operational data may e.g. indicate whether a component CP1, ..., CPN or another device is turned on or off.

Figure 2:
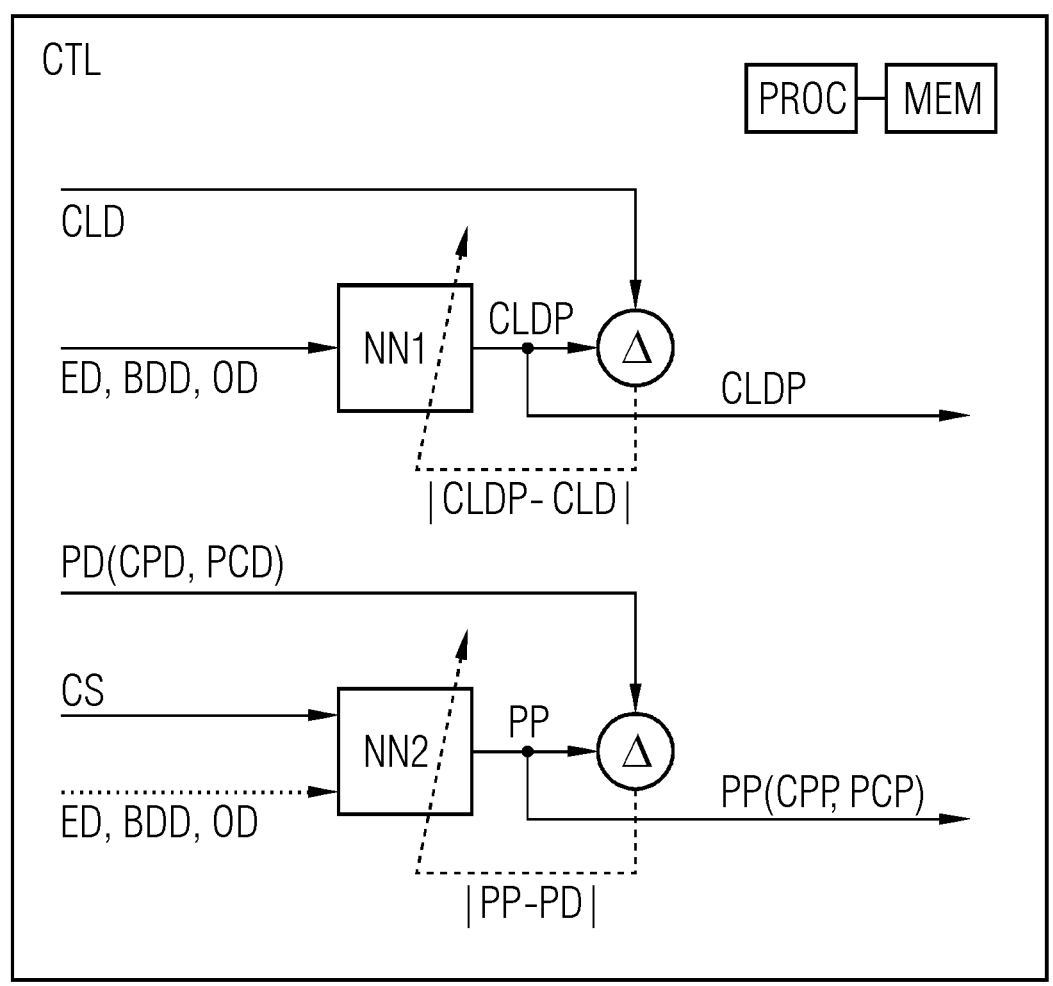
FIG. 2 depicts an inventive controller for the chiller plant in a training phase.

FIG. 2 shows a schematic representation of an inventive controller CTL for the chiller plant CP in a training phase. The controller CTL comprises a processor PROC for executing method steps of the inventive method, and a memory MEM for storing processing data. The memory MEM also comprises non-transient memory for storing a program implementing the inventive method. Reference signs in FIG. 2 which are identical to those in FIG. 1 denote the same entities, which are embodied as described above.

The controller CTL further comprises a first machine learning model NN1, which is embodied as an artificial neural network. The first machine learning model NN1 should be trained to predict a cooling load demand of the building BD or of parts of it from environmental data ED, building data BDD, and occupancy data OD. The data ED, BDD, and OD are embodied as described above. In particular, the environmental data ED comprise calendar dates, time data and/or other data affecting the cooling load demand of the building BD or parts of it.

The environmental data ED, the building data BDD, and the occupancy data OD are provided in allocation to cooling load demand data CLD quantifying an actual cooling load demand, which occurred together with the allocated data ED, BDD, and OD.

The data ED, BDD, OD, and/or CLD may be obtained by the controller CTL from historical data or from sensor data measured during operation of the chiller plant CP. The historical data may be read from a storage of the controller CTL or received from an external source of training data.

The environmental data ED, the building data BDD, the occupancy data OD, and the cooling load demand data CLD are used as first training data for training the first machine learning model NN1. For this training the environmental data ED, the building data BDD, and the occupancy data OD are transmitted and input to an input layer of the first machine learning model NN1. Depending on this input, the first machine learning model NN1 outputs a predicted cooling load demand CLDP via an output layer.

The first machine learning model NN1 is now trained in such a way that the predicted cooling load demand CLDP predicted from the input data ED, BDD, and OD gets as close as possible to the allocated, real cooling load demand CLD.

The term training generally means that a mapping from input data of a machine learning model to output data of that machine learning model is optimized with regard to predetermined and/or learned criteria during a training phase. In the present case, the criteria comprise a prediction error of the respective machine learning model. For minimizing a prediction error several machine learning methods, in particular methods for supervised learning are available. The mapping can be optimized by tuning the parameters of the machine learning models. In case of artificial neural networks, a connective structure of its neurons and/or weights of connections between the neurons may be varied in order to optimize the mapping. For such optimizations a multitude of numerical standard methods, like e.g. gradient descent methods or adaptive moment estimation methods are available.

In the present case, the predicted cooling load demands CLDP output by the first machine learning model NN1 are compared with actual cooling load demand data CLD. In doing so, distances between predicted cooling load demands CLDP and actual cooling load demand data CLD are determined, e.g. as Euclidian distances between vectors specifying the quantities CLDP and CLD or as absolute values |CLDP−CLD| of differences between them. The distances are returned to the first machine learning model NN1—as indicated by a dashed arrow in FIG. 2—in order to be minimized by adjusting e.g. neural weights of the first machine learning model NN1.

In this way the first machine learning model NN1 learns dependencies between environmental data ED, building data BDD, and occupancy data OD on the one hand, and an expected cooling load demand on the other hand. After a successful training the first machine learning model NN1 is likely to be able to predict from environment data ED, building data BDD, and occupancy data OD a probable cooling load demand.

Optionally, a predefined cooling load profile may be adopted, which may come from other predictions based on building occupation patterns and/or on other prominent factors, like e.g. scheduled events, as a target of the demand.

The controller CTL further comprises a second machine learning model NN2, which is also embodied as an artificial neural network. The second machine learning model NN2 should be trained to predict a cooling power, a power consumption and/or other performance parameters of the chiller plant CP from control signals CS for the chiller plant CP and optionally from the environmental data ED, building data BDD, and/or occupancy data OD.

The control signals CS comprise signals to control the chiller plant CP or its components, and/or to adjust or set control parameters or other tunable parameters of the chiller plant CP or of its components. In particular, the control signals CS may set a speed of a condenser water pump, a speed of a chilled water pump, a speed of a cooling tower fan, a water pipe pressure set point, a chiller set point, and/or a chiller water valve opening degree. The control signals CS may be applied chiller specific or across different chillers.

In order to enable the second machine learning model NN2 to automatically adapt to different configurations of chiller plant components, several or all of the chiller plant components, though differing in their inner dynamics, may be jointly modeled by the second machine learning model NN2 in an at least partially component-agnostic manner. In particular, the second machine learning model NN2 may include one or more modelling parameters that are common to several jointly modeled components.

The control signals CS are provided in allocation to performance data PD resulting from applying these control signals CS to the chiller plant CP or to its components. The performance data PD quantify a performance of the chiller plant CP or of its components and may be embodied as described above. In particular, the performance data PD comprise cooling power data CPD quantifying a cooling power resulting from applying the control signals CS to the chiller plant CP, and power consumption data PCD quantifying a power consumption resulting from applying the control signals CS to the chiller plant CP. The performance data PD may further quantify other performance quantities or other operational data related to a performance of the chiller plant CP or of its components.

The control signals CS and/or the performance data PD may be obtained by the controller CTL from historical data or from sensor data measured during operation of the chiller plant CP. The historical data may be read from a storage of the controller CTL or received from an external source of training data. The control signals CS and/or the performance data PD are collected with a collection rate or update time of about 15 minutes, which corresponds to an industrial practice.

The control signals CS, the performance data PD, and optionally the environmental data ED, the building data BDD, and/or the occupancy data OD are used as second training data for training the second machine learning model NN2. For this training the control signals CS are transmitted and input to an input layer of the second machine learning model NN2. Optionally, the environmental data ED, the building data BDD, and/or the occupancy data OD are also transmitted and input to the input layer of the second machine learning model NN2 in order to improve the training and prediction quality of that machine learning model NN2. In FIG. 2 this option is indicated by a dotted arrow. Depending on the input, the second machine learning model NN2 outputs predicted performance data PP via an output layer. The predicted performance data PP particularly comprise a predicted cooling power CPP and a predicted power consumption PCP of the chiller plant CP.

The second machine learning model NN2 is now trained in such a way that the predicted performance data PP predicted from the input data CS, and optionally from the data ED, BDD and/or OD, get as close as possible to the allocated, real performance data PD. The training of the second machine learning model NN2 may be carried out like the training of the first machine learning model NN1 described above.

Specifically, the predicted performance data PP output by the second machine learning model NN2 are compared with actual performance data PD. In doing so, distances |PP−PD| between the predicted performance data PP and the actual performance data PD are determined as described above. The distances |PP−PD| are returned to the second machine learning model NN2—as indicated by a dashed arrow in FIG. 2—in order to be minimized by adjusting e.g. neural weights of the second machine learning model NN2.

In this way, the second machine learning model NN2 learns dependencies between control signals CS and optionally environmental data ED, building data BDD, and/or occupancy data OD on the one hand, and on the other hand, an expected performance of the chiller plant CP when applying these control signals CS to the chiller plant CP.

After a successful training the second machine learning model NN2 is likely to be able to predict from control signals CS and optionally from environmental data ED, building data BDD, and/or occupancy data OD, probable performance data PP particularly comprising a predicted cooling power CPP and a predicted power consumption PCP of the chiller plant CP. In a sense, the trained second machine learning model NN2 may be regarded as a functional representation of the above dependencies.

Figure 3:
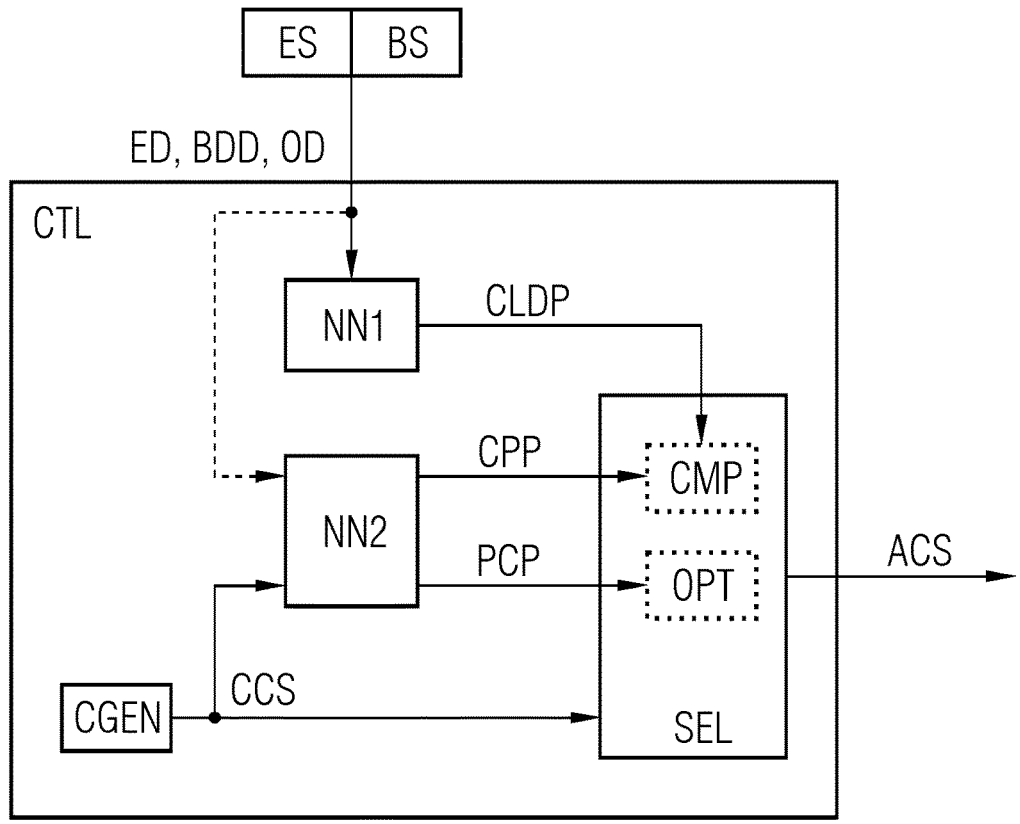
FIG. 3 depicts the trained controller generating control signals for the chiller plant.

FIG. 3 shows a schematic representation of the trained controller CTL generating applicable control signals ACS for controlling the chiller plant CP. Reference signs in FIG. 3 which are identical to those in FIG. 1 or 2 denote the same entities, which are embodied as described above.

The controller CTL receives from the environment sensors ES and the building sensors BS actual environmental data ED, building data BDD, and occupancy data OD. The received actual data ED, BDD, and OD are input to the input layer of the first machine learning model NN1, which was trained as described above in order to predict from the input data ED, BDD, and OD resulting cooling load demands CLDP of the building BD or of parts of it. The predicted cooling load demands CLDP are output via the output layer of the trained machine learning model NN1.

The controller CTL further comprises a control signal generator CGEN for generating candidate control signals CCS. The generated candidate control signals CCS are valid signals for controlling the CP or its components. A simple application of such generated candidate control signals CCS, however, may generally not lead to an optimal behavior of the chiller plant CP. Therefore, it is intended to select from the candidate control signals CCS those control signals which are expected to control the CP in an optimized way.

For this purpose, the candidate control signals CCS are input to the input layer of the trained second machine learning model NN2. The latter was trained as described above in order to predict from control signals and optionally from environmental data, building data and/or occupancy data a resulting performance, in particular a resulting cooling power and a resulting power consumption of the chiller plant CP. In FIG. 3 the optional input of the actual data ED, BDD, and OD to the second machine learning model NN2 is indicated by a dotted arrow.

Now, the trained second machine learning model NN2 predicts from the candidate control signals CCS and optionally from the actual input data ED, BDD, and OD resulting cooling powers CPP and resulting power consumptions PCP of the chiller plant CP.

The predicted cooling powers CPP and the predicted power consumptions PCP are transmitted from the trained second machine learning model NN2 to a selector SEL of the controller CTL. The selector SEL also receives the predicted cooling load demands CLDP from the trained first machine learning model NN1 and the candidate control signals CCS from the control signal generator CGEN.

The selector SEL comprises a comparator CMP and an optimizer OPT. The comparator CMP receives the predicted cooling load demands CLDP and the predicted cooling powers CPP and compares both quantities. If a predicted cooling power CPP fulfills a predicted cooling load demand CLDP, e.g. if a quantity CPP is equal or higher than a quantity CLDP, then the corresponding candidate control signals CCS are marked as applicable with regard to cooling power.

The optimizer OPT receives predicted power consumptions PCP and selects those of the corresponding candidate control signals CCS that result in a minimal or otherwise optimized predicted power consumption PCP. Advantageously, the optimizer OPT influences the control signal generator CGEN to generate candidate control signals CCS with less predicted power consumption PCP. For determining, selecting, and/or generating optimized candidate control signals CCS the optimizer OPT uses a particle swarm optimization or an evolutionary algorithm.

Finally, the selector SEL outputs those of the candidate control signals CCS as applicable control signals ACS that are marked as applicable with regard to cooling power and simultaneously have an optimal, e.g. minimal predicted power consumption PCP.

The applicable control signals ACS are output to the components of the chiller plant CP in order to control them in a way which fulfills an expected cooling load demand and simultaneously minimizes the needed power consumption.

Furthermore, the applicable control signals ACS may be used for deriving recommendations indicating advantageous settings, e.g. temperature settings to residents of the building BD. For this, recommendation data records may be derived from applicable control signals ACS and output via a user interface.

Figure 4:
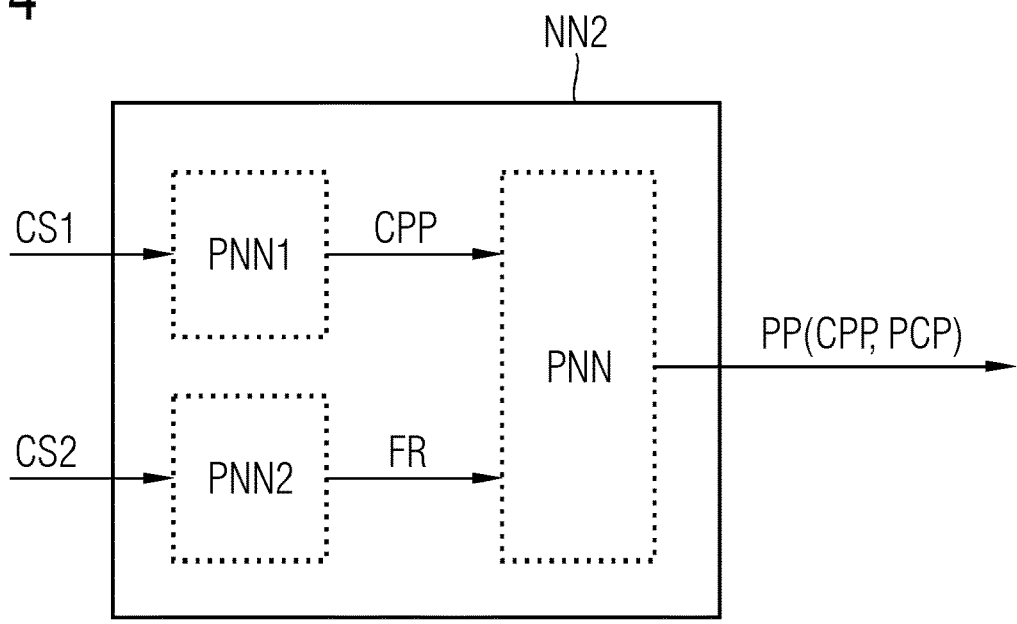
FIG. 4 depicts a specific embodiment of a machine learning model for the controller.

FIG. 4 shows a specific embodiment of the second machine learning model NN2 of the controller CTL in schematic representation. The specific second machine learning model NN2 comprises several partial machine learning models PNN1 PNN2, and PNN. The partial machine learning models PNN1 and PNN2 are each specific for modeling a particular chiller plant component, e.g. a condenser water pump CP1 and a chiller CP2. That specialization of the partial machine learning models PNN1 and PNN2 allows to incorporate or hard-code some specific domain knowledge about a respective component CP1 or CP2 in the specific structure of the respective partial machine learning model PNN1 or PNN2.

The partial machine learning models PNN1 and PNN2 are trained and executed in parallel. For this, component specific control signals CS1 are fed into the partial machine learning model PNN1 and component specific control signals CS2 are fed into the partial machine learning model PNN2. The partial machine learning model PNN1 is trained to specifically predict a cooling power CPP from the control signal CS1 while the partial machine learning model PNN2 is trained to specifically predict a flow rate FR of chilled water from the control signals CS2. The predicted cooling power CPP and the predicted flow rate FR are fed into the partial machine learning model PNN, which is trained to predict performance data PP including a predicted cooling power CPP and a predicted power consumption PCP from cooling powers CPP and flow rates FR. After the training the second machine learning model NN2 may be used for controlling the chiller plant CP as described above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for controlling a chiller plant for a building, comprising:
a) receiving, as first training data, environmental data of an environment of the building and cooling load demand data,
b) using the first training data for training a first machine learning model to predict a cooling load demand from environmental data,
c) receiving, as second training data, control signals for the chiller plant and cooling power data resulting from applying the control signals to the chiller plant,
d) using the second training data for training a second machine learning model to predict a cooling power from control signals,
e) receiving actual environmental data and predicting a resulting cooling load demand by the trained first machine learning model,
f) generating a plurality of candidate control signals for the chiller plant, sending the plurality of generated candidate control signals to the trained second machine learning model, and predicting a resulting cooling power by the trained second machine learning model,
g) receiving the generated plurality of candidate control signals, resulting cooling load demand, and resulting cooling power and selecting, from the plurality of generated candidate control signals, applicable control signals for which the resulting cooling power fulfills the resulting cooling load demand, and
h) outputting the applicable control signals for controlling the chiller plant.

2. The method as claimed in claim 1, further comprising:
receiving, as second training data, power consumption data resulting from applying the control signals to the chiller plant,
using the power consumption data for training the second machine learning model to predict a power consumption of the chiller plant from control signals,
predicting from the candidate control signals by the trained second machine learning model a resulting power consumption, and
selecting from the candidate control signals applicable control signals for which the predicted power consumption is lower than a predicted power consumption resulting from other candidate control signals.

3. The method as claimed in claim 1, further comprising:
receiving building data regarding a structure or status of at least one of the building and occupancy data regarding an occupancy of the building, and
taking the at least one of the building data and the occupancy data into account in the at least one of the training of the first machine learning model and in the training of the second machine learning model.

4. The method as claimed in claim 1, wherein several components of the chiller plant with different inner dynamics are jointly modeled by the second machine learning model in an at least partially component-agnostic manner.

5. The method as claimed claim 1, wherein the second machine learning model comprises a partial machine learning model specifically adapted for modeling a particular component of the chiller plant.

6. The method as claimed in claim 1, further comprising:
generating a recommendation data record from the applicable control signals, and
outputting the recommendation data record via a user interface.

7. The method as claimed in claim 1, wherein at least one of the first machine learning model and the second machine learning model comprises at least one of an artificial neural network, a recurrent neural network, a convolutional neural network, a Bayesian network, an autoencoder, a deep learning architecture, a reinforcement learning model, a support vector machine, a data driven trainable regression model, a k-nearest neighbor classifier, a physical model and a decision tree.

8. The method as claimed in claim 1, comprising:
measuring further at least one of first training data and further second training data during operation of the chiller plant, and
further training at least one of the trained first machine learning model and the trained second machine learning model during the operation of the chiller plant by at least one of the further first training data and the further second training data.

9. The method as claimed in claim 1, wherein
the applicable control signals are determined by at least one of a particle swarm optimization method, a genetic algorithm and a gradient decent method.

10. A controller for controlling a chiller plant for a building, adapted to perform the method according to claim 1.

11. A chiller plant with the controller according to claim 10.

12. A computer program product, comprising a computer readable hardware storage device having computer readable program code stored therein, said program code executable by a processor of a computer system to implement a method for controlling a chiller plant for a building, the method including:
a) receiving, as first training data, environmental data of an environment of the building and cooling load demand data,
b) using the first training data for training a first machine learning model to predict a cooling load demand from environmental data,
c) receiving, as second training data, control signals for the chiller plant and cooling power data resulting from applying the control signals to the chiller plant,
d) using the second training data for training a second machine learning model to predict a cooling power from control signals,
e) receiving actual environmental data and predicting a resulting cooling load demand by the trained first machine learning model,
f) generating a plurality of candidate control signals for the chiller plant, sending the plurality of generated candidate control signals to the trained second machine learning model, and predicting a resulting cooling power by the trained second machine learning model,
g) receiving the plurality of generated candidate control signals, resulting cooling load demand, and resulting cooling power and selecting, from the plurality of generated candidate control signals, applicable control signals for which the resulting cooling power fulfills the resulting cooling load demand, and
h) outputting the applicable control signals for controlling the chiller plant.

13. A non-transient computer readable storage medium storing a computer program product according to claim 12.

* * * * *